UNITED STATES PATENT OFFICE.

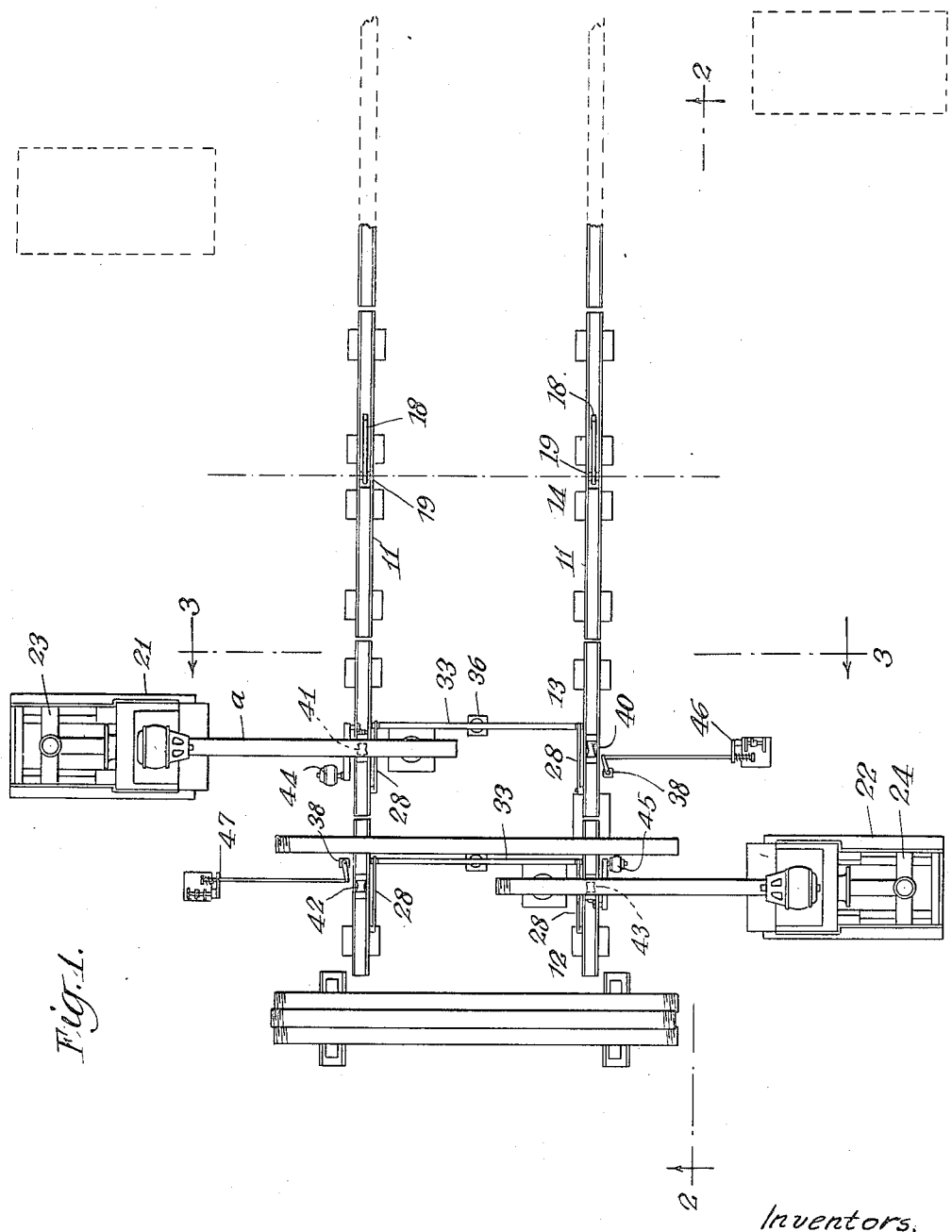

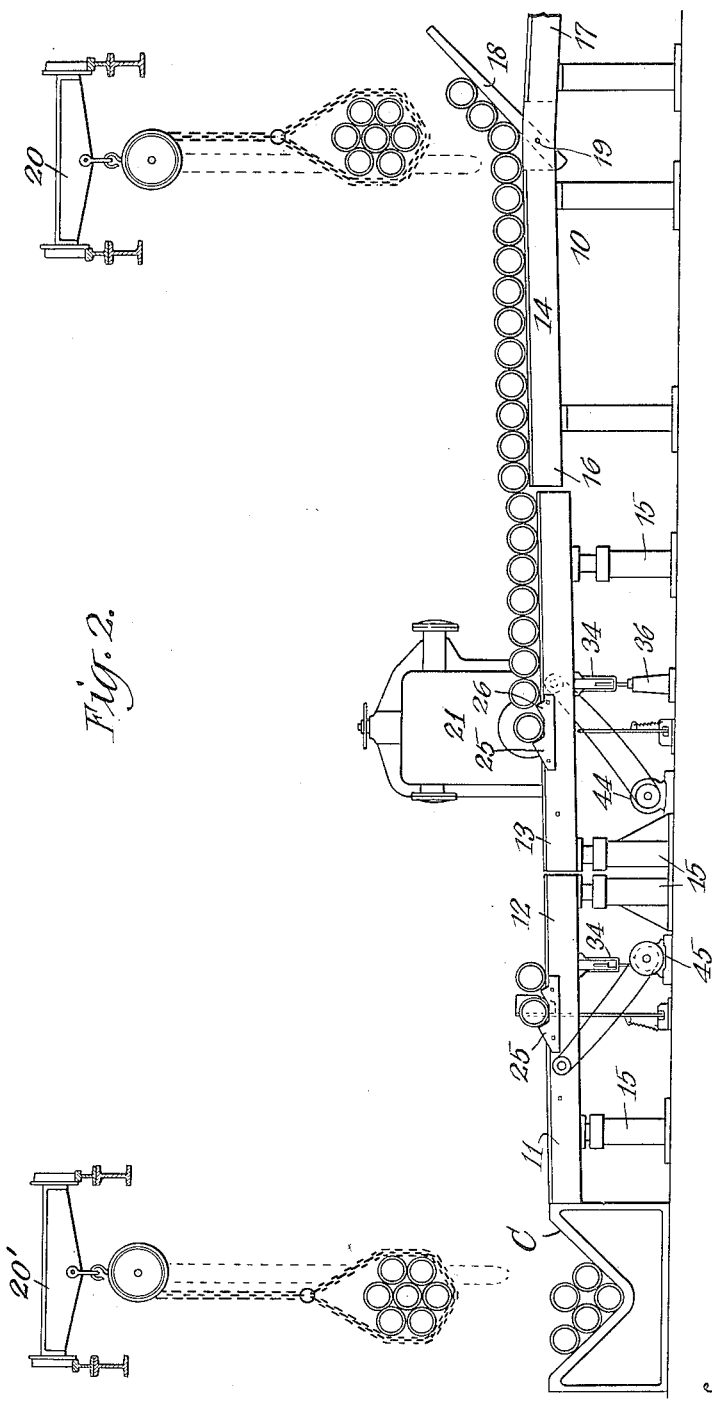

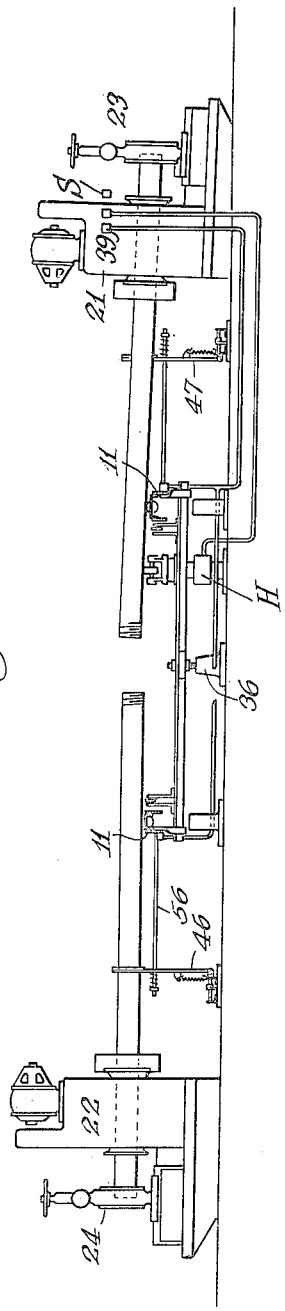

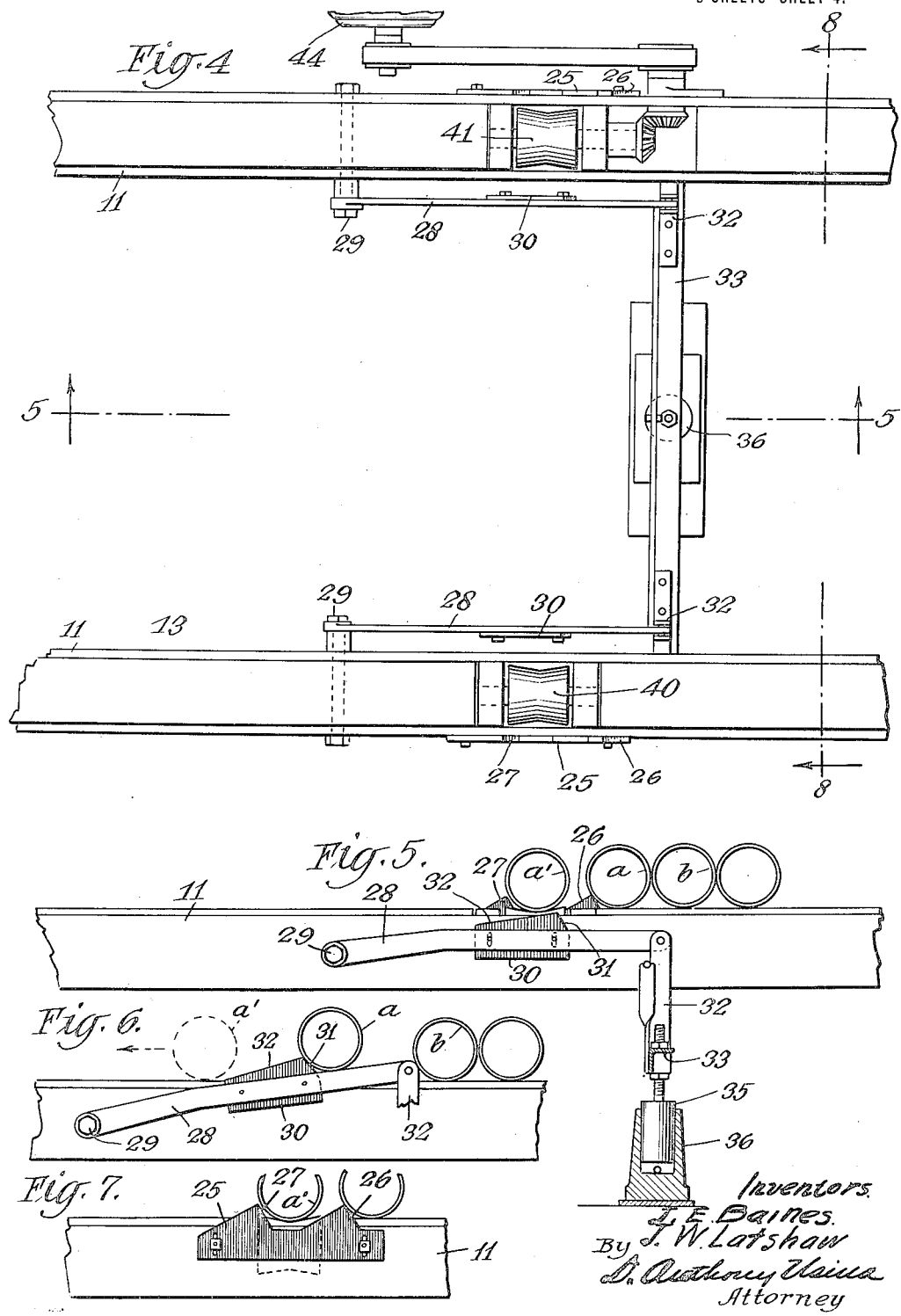

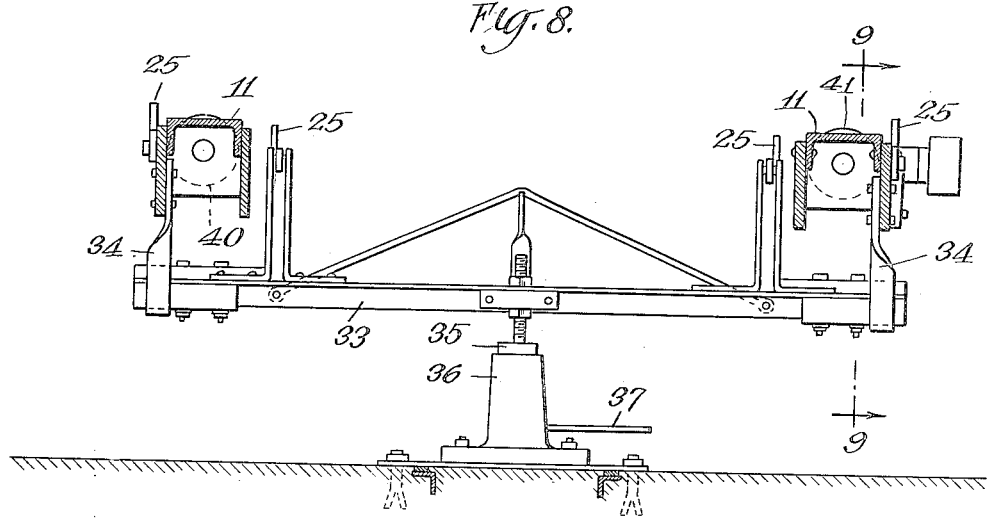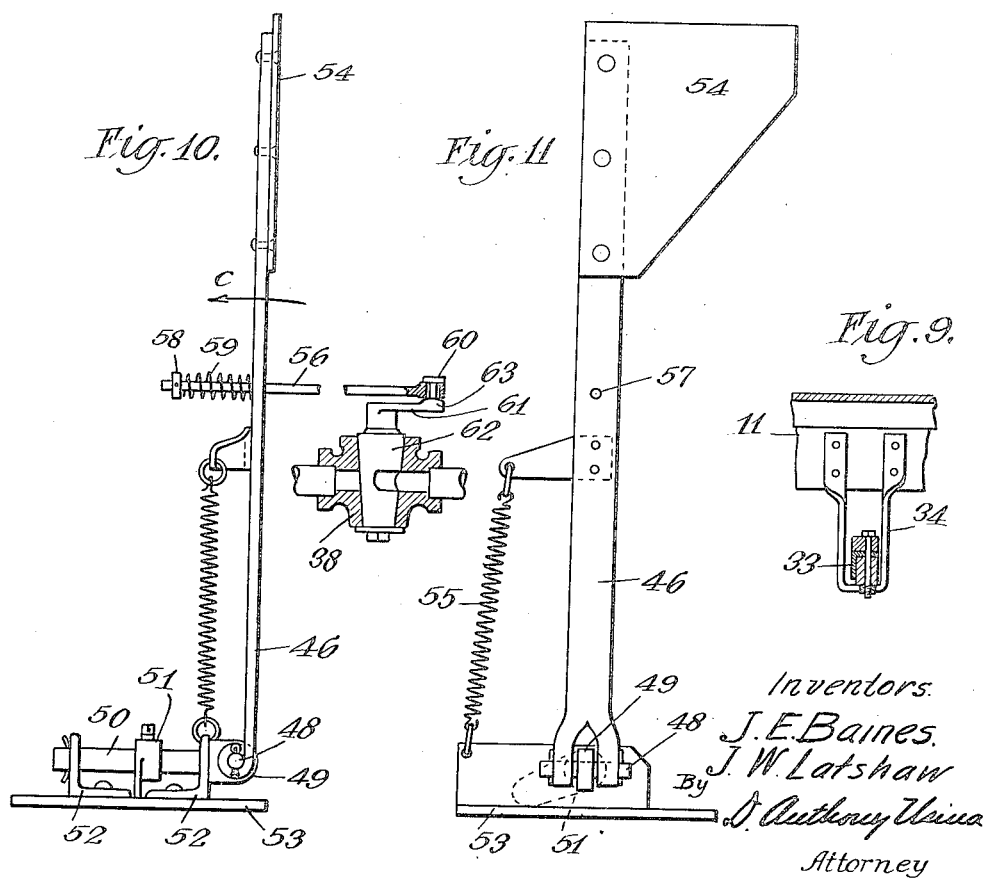

JOSEPH E. BAINES AND JOSEPH W. LATSHAW, OF PITTSBURGH, PENNSYLVANIA, ASSIGNORS TO NATIONAL TUBE COMPANY, A CORPORATION OF NEW JERSEY.

MACHINE FOR HANDLING PIPES.

1,285,584.   Specification of Letters Patent.   Patented Nov. 26, 1918.

Application filed March 22, 1918. Serial No. 224,007.

*To all whom it may concern:*

Be it known that we, JOSEPH E. BAINES and JOSEPH W. LATSHAW, both citizens of the United States, and resident of Pittsburgh, in the county of Allegheny and State of Pennsylvania, have invented certain new and useful Improvements in Machines for Handling Pipes, of which the following is a specification.

Heretofore large pipes have been fed to the threading tools by hand which was necessarily a slow and inefficient method of feeding, and the present invention is an improvement in the method as well as the means for carrying out the same.

Our invention aims to provide the method and means for feeding comparatively heavy pipe to threading tools in a simpler, quicker and less expensive manner than is possible with the means and methods now in use.

The invention comprises the combination and arrangement of runways and automatic and power driven devices for feeding the pipe into operative engagement with pipe-threading tools as set forth in the following description and particularly pointed out in the subjoined claims.

Referring to the drawings,—Figure 1 is a somewhat diagrammatic plan showing the general arrangement of the various elements;

Fig. 2 is a side elevation partly in section, being viewed substantially on the line 2—2 of Fig. 1;

Fig. 3 is a transverse section partly in elevation in a plane indicated by line 3—3 of Fig. 1;

Fig. 4 is a fragmentary plan view of the runway showing the transfer mechanism;

Fig. 5 is a longitudinal section on the line 5—5 of Fig. 4;

Fig. 6 is a detail illustrating a different position of certain of the parts shown in Fig. 5;

Fig. 7 is a side elevation of a portion of the runway illustrating a fixed stop secured thereto which coöperates with the transfer mechanism;

Fig. 8 is a transverse section on the line 8—8 of Fig. 4;

Fig. 9 is a detail section on the line 9—9 of Fig. 8;

Figs. 10 and 11 are respectively side and front views of a pivoted valve operating device, the valve operated thereby being shown somewhat diagrammatically in Fig. 10.

Referring first to Figs. 1 to 4 inclusive, the runway 10 comprising duplicate side guide rails 11—11 is made up of sections 12, 13 and 14. The sections 12 and 13 are sustained by adjustable screw-jacks 15 whereby they may be adjusted to different elevations or inclinations according to the various sizes of pipe being handled. The section 14 is located centrally between two gangs of threading tools the end 16 being inclined toward the left as shown in Fig. 2 and the portion 17 being inclined toward the right. Selecting levers 18—18, pivoted at 19—19 in the center of the section 14 are adapted to direct the pipe either to the right or the left as desired.

As shown in Fig. 2 a quantity of pipe handled by the crane 20 may be deposited on the section 14 and with the arm 18 in the position shown the pipe will travel by gravity toward the left of the section 14 of the runway. It is clear that by swinging the arm 18 toward the left that the pipe could readily be caused to travel toward the right to be operated on by a suitable gang of tools which might conveniently be located there as shown in dotted lines in Fig. 1.

In practice it has been found convenient to utilize this arrangement as the threading tools can thus be continuously operated at full capacity, a constant supply of pipe being supplied to and carried by the runways for this purpose.

The construction and arrangement of the threading tools and feeding devices is identical on both sides of the centrally located levers 18. It is only deemed necessary to herein describe and illustrate in detail one gang of tools and feeding devices.

The threading tools 21 and 22 provided with suitable threading dies 23 and 24 of known design and construction are located at intervals on opposite sides of the runway, the tool 21 being at a slightly higher elevation than the tool 22 for convenient coöperation with the feeding devices to be hereinafter described.

Opposite the threading tool 21 are fixed stops 25—25 adjustably secured by a slot and bolt connection as shown in Fig. 7 to rails 11—11 of the section 13 of the runway. Each of these stops is provided with projections 26 and 27. The projection 27 on the fixed stops 25 are provided to coöperate with and assist the transfer levers 28 in positioning the pipe upon the feed rollers. The transfer levers 28—28, are pivotally secured at 29—29 to the rails 11 a short distance beyond the fixed stops, and they have secured thereto plates 30—30, each formed with inclined surfaces 31 and 32. At their free ends the levers 28 are pivotally connected to brackets 32—32 which are secured to a transverse angle bar 33, the outer ends of which are guided in saddles 34—34 secured to the side rails 11 as clearly shown in Figs. 8 and 9.

At a point intermediate its length, the cross-bar 33 is adjustably secured to a piston 35 operating in a cylinder 36. Fluid pressure is supplied to the cylinder 36 by pipe 37 which is connected with a valve 38 (Fig. 10) adapted to automatically control the movements of the piston 35 as will be hereinafter described.

Manually operated valve 39 (Fig. 3) conveniently located near one of the threading tools, is also provided to control the movement of the piston 35.

Grooved feed rollers 40 and 41 are mounted in suitable bearings secured to the rails 11 of the section 13 of the runway, and similar rollers 42 and 43 are secured to the rails 11 of the section 12 of the runway. The rollers 41 and 43 are power driven, for example, by means of motors 44 and 45 and suitable gearing such as a worm and worm wheel or by bevel gears as shown in Figs. 1 and 4. The dead rollers 40 and 42 merely act as anti-friction guides for the pipe during the feeding operation.

The several rollers 40, 41, 42 and 43 as shown are fashioned with V shaped grooves and are so located and mounted that they will support a pipe in accurate alinement with the threading tools 21 and 22 when the pipes are deposited thereon by the transfer mechanism, the operation of which will be presently described.

Located substantially in line with and on opposite sides to the runway with respect to the threading tools, are valve operating levers 46 and 47, each one of which is pivoted to a pin 48 (Figs. 10 and 11) supported by an extension 49 on the rock shaft 50 to which is secured a short stop lever 51, and the rock shaft is in turn pivotally supported in angle brackets 52 secured to a suitable bracket 53. At the free end of each of the levers 46 and 47 is secured a target 54 adapted to be engaged by the end of the pipe. The spring 55 and the arm 51 coöperate to maintain the lever 46 in the position shown in Fig. 11.

The function of the lever 46 is to operate the valve 38 which controls a supply of fluid pressure to the cylinder 36. One end of the rod 56 passes through a suitable aperture 57 in the lever and is provided with a collar 58 between which and the lever the spring 59 is interposed. At the opposite end the rod is secured by means of a stud 60 to the lever 61 which is in turn secured to the plug 62 of the valve.

The end 63 of the lever 61 is crowned and the connection between the stud 60 and the end of the rod 56 is somewhat of a loose one to permit a universal relative movement between the rod 56 and the lever 61.

In operation the crane 20 deposits a load of pipe on the section 14 of the runway, the selecting levers 18 having previously been set to deflect the pipes to be threaded either to the gang of tools on the right or left as desired. The pipes will roll down the inclined portion 16 of the runway 14 and onto the inclined section 13 until their travel is arrested by the projections 26—26 of the fixed stops 25—25 as shown in Figs. 2 and 7, whereupon the operator will open the valve 39 which will admit fluid pressure to the cylinder 36, thus elevating the piston 35 and cross bar 33 and thereby rocking the transfer levers 28—28 to the position shown in Fig. 6 which action will raise the foremost pipe a Fig. 5 off of the runway as shown in Fig. 6 and will cause it to roll forward on the transfer levers until its travel is arrested by the edge 31 of the plate 30.

At the same time, the pipe b which was adjacent to and in the rear of pipe a, will be prevented from rolling forward, the free end of the lever 28 obstructing its travel as indicated in Fig. 6. The operator will now exhaust the air from under the piston 35 by manipulation of the valve 39 which action will cause the pipe a to be deposited in the V-shaped groove of the transverse feed rollers 40 and 41. The operator now manipulates a suitable switch S (Fig. 3) which may be conveniently located near the threading tool 21 to start the motor 44 which will cause the roller 41 to feed the pipe a' into engagement with the die 23 in the threading tool 21. After the end pipe is threaded the operator will again manipulate the switch S in such a manner as to reverse the motor 44 thereby feeding the pipe out of engagement with the threading tool.

As a pipe reaches a position at which it is approximately centralized on the runway, its end will come into engagement with the target 54 of the lever 46 and rock it in a direction of the arrow c shown in Fig. 10 which action will rotate the plug 62 of the air valve 38 thereby admitting air to the cylinder 36 which will again rock the transfer levers 28, which action will lift the pipe a' off of the transverse feed rollers and permit it to roll down the inclined surface 32 of the plate 30 onto the runway as illustrated in Fig. 6.

At the same time, the pipe which was formerly restrained from moving forward by the projection 26, will be elevated by the transfer levers 28—28 and transferred from the runway and deposited on the feed rollers in a manner similar to that already described.

The pipes thus fed from the runway to the threading tool 21 and deposited on the runway roll along said runway by gravity until they reach a location in juxtaposition to the threading tool 22 whereupon the above described operations are again performed to feed the pipe in the opposite direction into engagement with the die 24 of the threading tool 22 to thread the opposite end of the pipe, after which the motor 44 is reversed and the pipe again fed forward until its end strikes the target of lever 47 whereupon the transfer mechanism operates in a similar manner to that described above, thus releasing the pipe and permitting it to roll along to the end of the runway and into the cradle C from which the accumulation of pipes may be removed by the crane 20'.

In the event that the length of the pipes being threaded is great enough to strike the edge of the levers 46 and 47 in its travel along the runway, these levers will simply rock on their supporting shaft 50 as the pipe passes and will be returned to their operative positions by the spring 55.

Suitable auxiliary dead guide rollers, not shown, may be used between the rails of the runway and between the runway and the threading tools to form additional supports for the pipe when it is being fed transversely.

In some instances it is desirable to feed the pipe at an angle to the threading tools as shown at the right in Fig. 3, in which case a hydraulic lifting jack H carrying suitable guide rollers is employed.

It is obvious that the above described machine would operate just as effectively on tubing or shafting as upon pipe, and it is to be understood that the word pipe as herein used is to include tubing or shafting as well.

Though we have described with great particularity in detail certain specific embodiments of our invention, yet it is not to be understood therefrom that the invention is restricted to the specific embodiments disclosed. Various other modifications in detail and in the arrangement of the parts may be made by those skilled in the art without departure from the invention as defined in the following claims.

What we claim is:—

1. A pipe feeding machine including inclined runways on which the pipe travels by gravity to positions approximately in alinement with threading tools and means for accurately alining the pipe with the threading tools and feeding it into and out of engagement with said threading tools.

2. In combination with threading tools a pipe feeding machine having runways inclined in opposite directions on which the pipe travels by gravity to different gangs of threading machines and selective means for directing the travel of the pipe toward either gang of threading tools.

3. In a pipe feeding machine runways on which the pipe travels, rollers arranged to feed the pipe into and out of engagement with pipe threading tools and means for transferring the pipe from said runways to said rollers.

4. The combination of a plurality of pipe threading tools set at different elevations, inclined runways on which the pipe travels and rollers arranged at intervals along the runways to feed the pipe into and out of engagement with said threading tools.

5. The combination of an inclined runway on which the pipe travels, pipe threading tools set at different elevations and arranged on opposite sides of the runway, feed rollers arranged at intervals along the runway and means for first feeding the pipe into and out of engagement with one pipe threading tool and then into and out of engagement with a pipe threading tool on the opposite side of the runway.

6. In a pipe feeding machine a runway on which the pipe travels, means for feeding the pipe in directions at right angles to the direction of the travel of the pipe on the runway, and means controlled by the movement of the pipe whereby the pipe is automatically transferred from said feeding means to said runway.

7. In combination with threading tools, means for rolling pipes to positions approximately into alinement with said threading tools, feed rollers fashioned to aline the pipes with the threading tools and adapted to feed said pipes into and out of engagement with said tools.

8. In a pipe feeding machine a runway on which the pipe rolls, locating stops which arrest the travel of the pipe on the runway, means for feeding the pipe axially and means for transferring the pipe from the runway to said feeding means.

9. In a pipe feeding machine a runway on which the pipe rolls to a predetermined position, locating stops which arrest the travel of the pipe on the runway, power driven means for feeding the pipe axially and means for first transferring the pipe arrested by said fixed stop from said runway to said driven rollers and subsequently transferring the pipe from the feed rollers onto the runway.

10. In a pipe feeding machine runways on which the pipe rolls to a predetermined position, locating stops which arrest the travel of the pipe on the runway, power driven means for feeding the pipe axially and means for first transferring the pipe arrested by said fixed stop from said runway to said driven rollers and subsequently transferring the pipe from the feed rollers onto the runway, in a position beyond said locating stops so that the pipe is free to roll along the runways.

11. In a pipe feeding machine inclined runways, rollers for feeding the pipe axially and fluid pressure actuated means for transferring the pipe either from the runway to the feed rollers or from the feed rollers to the runway.

12. In a pipe feeding machine inclined runways, rollers for feeding the pipe axially and fluid pressure actuated means for transferring the pipe from said runways to said feed rollers.

13. In a pipe feeding machine inclined runways, rollers for feeding the pipe axially and fluid pressure actuated means controlled by the movement of the pipe for transferring the pipe from said feed rollers to the runways.

14. In a pipe feeding machine inclined runways adapted to sustain a plurality of pipes, fixed stops for arresting the travel of the pipes, rollers for feeding the pipe axially, and means for intermittently transferring the foremost pipe to said feed rollers, and preventing the forward movement of the following pipes during the transferring operation.

15. In a pipe feeding machine inclined runways adapted to sustain a plurality of pipes, feed rollers and means for first transferring one pipe from the feed rollers to the runway and secondly transferring a second pipe from the runway to the feed rollers and simultaneously preventing the travel of the adjacent pipe and thirdly releasing said last mentioned pipe thereby permitting the same to travel forward on the runway.

16. The combination of a plurality of pipe threading tools set at different elevations, inclined runways on which the pipe travels, rollers arranged at intervals along the runway to feed the pipe into and out of engagement with said threading tools, and means for alternately transferring the pipe from the runways to the feed rollers and from the feed rollers to the runways.

17. In a pipe feeding machine, inclined runways along which the pipe travels by gravity, rollers intermediate the ends of the runways for feeding the pipe axially and means for intermittently effecting a transfer of the pipe between the runways and the feed rollers.

18. In a pipe feeding machine inclined runways adapted to sustain a plurality of pipes, rollers associated with said runways and arranged to feed the pipe across the runways and means for transferring the pipe from one of the runways to the feed rollers and then from the feed rollers to the other of the runways.

19. In combination with a pipe runway, rollers for feeding the pipe across the runway and means for transferring the pipe alternately from the runway to said feed rollers and from the feed rollers to the runway, comprising pivoted transfer levers having free ends for arresting the travel of the pipe along the runway, inclined cam surfaces for engagement with the pipe carried by the feed rollers whereby upon the upward movement of said levers the pipe is raised from the feed rollers and caused to roll forward onto the runway, and abutments arranged to arrest the travel of the pipe along the transfer levers.

20. The method of feeding pipe to threading machines which consists in depositing a quantity of pipe on an inclined runway on which it travels by gravity to a location in proximity to a threading tool, then alining it with and feeding it by power actuated means into engagement with said threading tool, then feeding it out of engagement with said threading tool and again depositing it on the inclined runway.

In testimony whereof we have hereunto set our hands.

JOSEPH E. BAINES.
JOSEPH W. LATSHAW.